United States Patent [19]

Misra et al.

[11] Patent Number: 5,603,838

[45] Date of Patent: Feb. 18, 1997

[54] PROCESS FOR REMOVAL OF SELENIUM AND ARSENIC FROM AQUEOUS STREAMS

[75] Inventors: Manoranjan Misra, Reno, Nev.; Deba C. Nayak, Minneapolis, Minn.

[73] Assignee: Board of Regents of the University and Community College Systems of Nevada, Reno, Nev.

[21] Appl. No.: 452,034

[22] Filed: May 26, 1995

[51] Int. Cl.$^6$ ............................. C02F 1/28; C02F 9/00
[52] U.S. Cl. ..................... 210/665; 210/669; 210/679; 210/683; 210/911
[58] Field of Search .................................. 210/683, 684, 210/679, 911, 912, 631, 665, 669

[56] References Cited

U.S. PATENT DOCUMENTS

| | | | |
|---|---|---|---|
| 3,933,635 | 1/1976 | Marchant | 210/50 |
| 3,956,118 | 5/1976 | Kleber et al. | 210/711 |
| 4,405,464 | 9/1983 | Baldwin et al. | 210/717 |
| 4,519,913 | 5/1985 | Baldwin et al. | 210/610 |
| 4,935,146 | 6/1990 | O'Neill et al. | 210/684 |
| 5,264,133 | 11/1993 | Forschner et al. | 210/684 |

OTHER PUBLICATIONS

Bar-Yosef, B. and Meek, D., "Selenium Sorption by Kaolinite and Montmorillonite," *Soil Science* (1987) 144:11–19.

Ghosh, M. M. and Yuan, J. R., "Adsorption of Inorganic and Organoarsenicals on Hydrous Oxides," *Environmental Progress* (1987) 6(3):150–157.

Gupta, S. K. and Chen, K. Y., "Arsenic Removal by Adsorption," *Journal of Water Pollution Control Federation* (Mar. 1978) 50(3):493.

Fitzgerald, N. M. et al., "Novel Magnesium Oxide–Aluminum Oxide Hydrotalcite–like Adsorbent for the Removal of Toxic Metals from Aqueous Stream," *Alcoa Laboratories*, Alcoa Center PA.

Harper, T. R. and Kingham, N. W., "Removal of Arsenic from Wastewater Using Chemical Precipitation Methods," *Water Environmental Research* (1992) 64(3):200–203.

Jinadasa, K. B. P. N. and Dissanayake, C. B., "The effect of selenium on fluoride–clay interactions: possible environmental health implications," *Environmental Geochemistry and Health* (1992) 14(1):3–7.

Masscheleyn, P. H. et al., "Transformations of Selenium as Affected by Sediment Oxidation–Reduction Potential and pH," *Environ. Sci. Technol* (1990) 24(1):91–96.

Merrill, D. T. et al., "Field Evaluation of Arsenic and Selenium Removal by Iron Coprecipitation," *Environmental Progress* (1987) 6(2):82–90.

Murphy, A. P., "Removal of Selenate from Water by Chemical Reduction," *Industrial Engineering and Chemical Research* (1988) 27:187–191.

Rubel, F. R. and Hathaway, S. W., "Pilot Study for Removal of Arsenic from Drinking Water at the Fallon, Nevada, Naval Air Station," Project Summary, Research and Development, EPA/600/S2–85/094, Sep. 1985.

U.S. Environmental Protection Agency, "Manual of Treatment Techniques for Meeting the Interim Primary Drinking Water Regulations," May 1977, pp. 29–31.

*Primary Examiner*—Ivars Cintins
*Attorney, Agent, or Firm*—Greenlee, Winner and Sullivan, P.C.

[57] ABSTRACT

A process for removing selenium and/or arsenic from aqueous streams including industrial process waters and drinking water is provided comprising contacting the stream with a composition comprising lanthanum oxide whereby selenium and/or arsenic are adsorbed. Preferred compositions comprise lanthanum oxide and alumina.

18 Claims, 16 Drawing Sheets

PROCESS FOR REMOVAL OF SELENIUM AND ARSENIC FROM AQUEOUS STREAMS

FIELD OF THE INVENTION

This invention is in the field of removal of toxic metals from aqueous solution, specifically, removal of selenium and/or arsenic from aqueous solution, industrial process waters, and drinking water.

BACKGROUND OF THE INVENTION

One of the major problems facing industries such as mining, precious metals, and energy industries (e.g., coal mining and coal fired power plants) is removal of selenium and arsenic from process effluent to meet federal and state compliance standards.

Stringent standards for the maximum level of pollutants in water to be used for drinking or related to ground water systems are being promulgated by federal and state agencies. The current allowable maximum concentration level for selenium in drinking water set by federal standards is 0.01 milligrams per liter. Selenium removal from ground water presents a challenge in certain geographical areas of the United States. The State of New Mexico has proposed a selenium standard of 0.05 milligrams per liter for discharge into the ground water system of the state.

The presence of arsenic in water beyond the permissible limit (0.05 mg/l) has carcinogenic effects in living beings. The toxicity of arsenic varies greatly according to its oxidation state. As(III) has been reported to be more toxic than As(V) and methylated arsenic compounds. In a study of subsurface migration of organic and inorganic arsenic in an abandoned herbicide manufacturing plant, a total arsenic concentration of 900 mg/l was recorded at a depth of 35 feet of sand underlain with a 50 foot clay layer.

Several methods are available for reducing selenium and arsenic concentrations to acceptable levels in aqueous solutions. One method employed to remove or substantially reduce the concentration of soluble inorganic pollutants such as heavy metals in water is chemical precipitation of the metals as their oxides or their hydroxides. This precipitation generally is effected by the addition of lime, alum or an iron salt to the water at an appropriate pH. Other treatment methods, such as ion exchange, reverse osmosis, electrolysis or distillation, also can be effective in removing various pollutants. However, these methods are considerably more expensive and generally narrower in application scope than is desirable for the treatment of great volumes of water. Often it is difficult to remove trace selenium and arsenic using the conventional methods.

It is known that selenium ions can be removed from aqueous systems employing chemical precipitation if the selenium is present in the selenite (Se(IV)) oxidation state. Generally, such precipitation methods comprise treating the selenium-containing aqueous system with an iron salt, such as ferric or ferrous sulfate, chloride or hydroxide, or with aluminum or zinc in some appropriate form such as powder or granules. However, such chemical precipitation methods provide only very limited removal of selenium when it is present in the selenate (Se(VI)) oxidation state. Therefore, when selenium is present in the selenate oxidation state, its removal generally is effected by either ion exchange or reverse osmosis.

In particular, experimental studies have shown that chemical precipitation employing ferric sulfate can achieve a significant removal of selenium in the selenite oxidation state from an aqueous stream. More particularly, when ground water containing 0.03 milligrams per liter of selenium in the Se(IV) oxidation state and having pH of 5.5 is treated with 30 milligrams of ferric sulfate per liter, about 85% of the selenium is removed from the water (U.S. Environmental Protection Agency, "Manual of Treatment Techniques for Meeting the Interim Primary Drinking Water Regulations," May 1977, pages 29–31).

U.S. Pat. No. 3,933,635 discloses a process for removing selenium ions present in the selenite oxidation state from acidic process waters. Acidic process water, having a pH of about 1.0 to 4.0, is reacted with a metallic reducing agent at a temperature in the range of from about 25° C. to about 85° C. for a sufficient time to reduce the soluble selenium in the selenite oxidation state to insoluble elemental selenium. Preferably, the temperature is maintained in the range of from about 50° C. to about 70° C. The reducing agent can comprise aluminum, iron or zinc in an appropriate form, such as, for example, a powder, scrap fragments, granules, wools and the like. The preferred reducing agent for selenium in the selenite oxidation state is zinc powder.

In contrast, laboratory tests and pilot plant studies have shown that chemical precipitation, employing alum, lime, ferrous sulfate or ferric sulfate, is substantially ineffective for removing selenium in the selenate (Se(VI)) oxidation state from water. Studies on water having a selenium Se(VI) concentration of 0.03 to 10 milligrams per liter have shown that the conventional chemical precipitation methods remove less than 10 percent of the selenium from the water (U.S. Environmental Protection Agency, "Manual of Treatment Techniques for Meeting the Interim Primary Drinking Water Regulations," May 1977, pages 29–31).

It has been shown that selenium ions in the selenate oxidation state can be removed by ion exchange or reverse osmosis. As previously indicated, these methods are prohibitively expensive when large volumes of an aqueous solution must be treated. Further, both methods produce a contaminated regeneration effluent that requires further treatment for selenium fixation or removal before disposal. Thus, the selenium removal problem still exists but in a more highly concentrated solution.

U.S. Pat. No. 4,405,464 provides a method by which selenium, as the selenate, can be chemically precipitated from an aqueous system using metallic iron. This process is also disclosed as being capable of removing a substantial portion of any selenium in its selenite oxidation state. This process is economically more attractive than either the ion exchange or reverse osmosis methods which have been proposed or which are currently in use. However, this method is not suitable for aqueous solutions having pH greater than 6.0. Thus, if the water is alkaline or neutral it is preferably acidified through the addition of a quantity of a mineral acid such as, for example, hydrochloric acid or sulfuric acid or any other acidic solution such as acidic mill process water.

Literature published to date by the EPA and others reports removal efficiency of greater than 98% of selenium with ALCOA™ F-1 alumina. However, the high chemical impurity level in F-1 results in a low point of zero charge which means low specific adsorption of negatively charged ions. F-1 alumina also has an inherently low chemisorption capacity, which makes this material a poor choice as an adsorbent for selenium in any form.

The following publications provide background information on the removal of selenium and arsenic from aqueous solutions:

1. Baldwin, R. A. et al., "Removal and Recovery of Selenium from Aqueous Solutions," U.S. Pat. No. 4,519,913 (1985).
2. Baldwin, R. A. et al., "Process for the Removal of Selenium from Aqueous Solutions," U.S. Pat. No. 4,405,464 (1983).
3. Bar-Yosef, B. and Meek, D., "Selenium Sorption by Kaolinite and Montmorillonite," Soil Science (1987) 144:11.
4. Brierley, C. L., "Selenium in Mine and Mill Environments," Randol at Mine Expo '92, p. 175.
5. Ghosh, M. M. and Yuan, J. R., "Adsorption of Inorganic and Organoarsenicals on Hydrous Oxides," Environmental Progress (1987) 6(3):150–157.
6. Gupta, S. K. and Chen, K. Y., "Arsenic Removal by Adsorption," Journal of Water Pollution Control Federation (March 1978) 50(3):493.
7. Harper, T. R. and Kingham, N. W., "Removal of Arsenic from Wastewater Using Chemical Precipitation Methods," Water Environmental Research (1992) 64(3):200–203.
8. Jinadasa, K. B. P. N. and Dissanayake, C. B., "The effect of selenium on fluoride-clay interactions: possible environmental health implications," Environmental Geochemistry and Health (1992) 14(1):3–7.
9. Marchant, W. N., "Method for Removing Soluble Selenium from Acidic Wastewater," U.S. Pat. No. 3,933,635 (1976).
10. Masscheleyn, P. H. et al., "Transformations of Selenium as Affected by Sediment Oxidation-Reduction Potential and pH," Environ. Sci. Technol (1990) 24(1):91–96.
11. Merrill, D. T. et al., "Field Evaluation of Arsenic and Selenium Removal by Iron Coprecipitation," Environmental Progress (1987) 6(2):82–90.
12. Murphy, A. P., "Removal of Selenate from Water by Chemical Reduction," Industrial Engineering and Chemical Research (1988) 27:187–191.
13. Rubel, F. R. and Hathaway, S. W., "Pilot Study for Removal of Arsenic from Drinking Water at the Fallon, Nevada, Naval Air Station," Project Summary, Research and Development, EPA/600/S2-85/094, September 1985.
14. Fitzgerald, N. M. et al., "Novel Magnesium Oxide-Aluminum Oxide Hydrotalcite-like Adsorbent for the Removal of Toxic Metals from Aqueous Stream," Alcoa Laboratories, Alcoa Center Pa.

SUMMARY OF THE INVENTION

The processes of this invention make it possible to substantially reduce the concentration of selenium ions in the selenite and selenate oxidation states or arsenic ions in the arsenite and arsenate oxidation states in an aqueous solution by adsorption with alumina doped with lanthanum oxide. Using this adsorbent, selenium concentration can be significantly reduced below the EPA standard of 0.01 mg/l.

Aqueous solutions which can be treated using the above process include effluents such as water from uranium, copper or molybdenum mining or leaching operations, mine seepage or drainage water, or any other aqueous stream which contains selenium ions in the selenite (Se(IV)) or selenate (Se(VI)) oxidation states, or arsenic in the arsenite (As(III)) or arsenate (As(V)) states.

A process is provided for removing at least one ionic species selected from the group consisting of selenium and arsenic from solution comprising:

a) contacting said solution with a composition comprising lanthanum oxide whereby said ionic species is adsorbed onto said composition to form an insoluble complex comprising lanthanum oxide and said ion;

b) separating said solution from said complex.

It has been found, surprisingly, that when a small amount of lanthanum oxide is added to alumina, the capacity of the resulting composition to adsorb selenium and/or arsenic is greatly enhanced over the case where additional alumina is added, and that it is possible to achieve final selenium and arsenic concentrations that are much lower than would be achievable with alumina alone. Although lanthanum oxide is more efficient at removing selenium and arsenic from solution than alumina, up to 90% of the lanthanum oxide can be replaced with the much less expensive alumina, while still attaining substantially improved selenium and arsenic removal or the use of alumina alone.

DETAILED DESCRIPTION OF THE PREFERRED EMBODIMENTS

Figure 1:
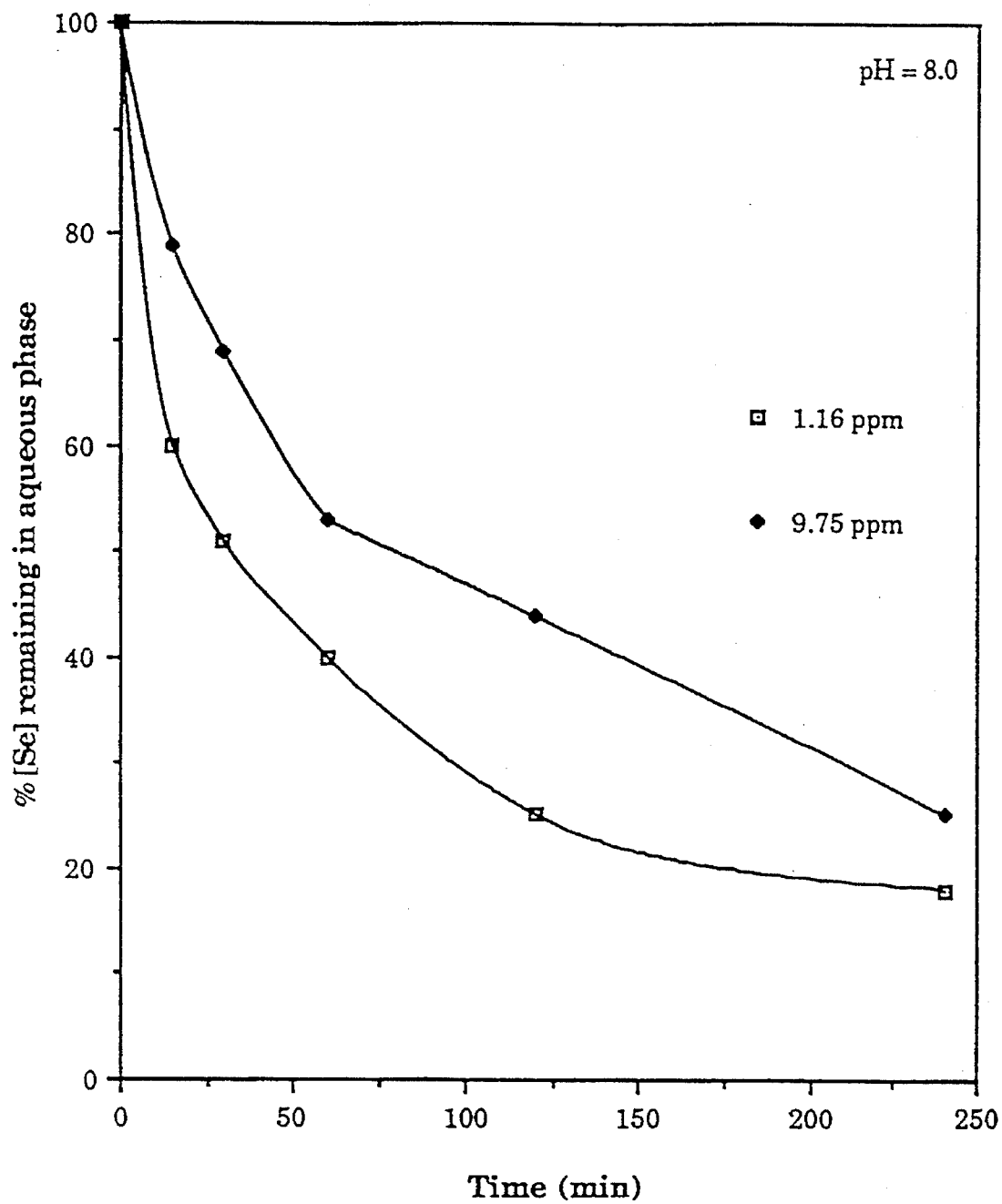
FIG. 1 shows removal of selenium with commercial alumina.

As is known to the art, selenium exists in both the plus 4 (IV) and plus 6 (VI) oxidation states, and arsenic exists in both the plus 3 (III) and plus 5 (V) oxidation states. The processes of this invention remove these ions in all their oxidation states. The term "ion" as used herein with respect to selenium and arsenic is synonymous with the term "ionic species" and refers to oxyanions of these metals. The oxyanions of selenium are selenite ($SeO_3^{-2}$) and selenate ($SeO_4^{-2}$). The oxyanions of arsenic are arsenite ($AsO_4^{-3}$) and arsenate ($AsO_4^{-2}$). The processes of this invention using lanthanum oxide and alumina remove only anions. They do not remove cations or metals.

The processes of this invention achieve removal of more than 98% of such ions from solution. Selenium concentrations of 0.01 mg/l or less are achieved, and arsenic concentrations of less than 0.05 mg/l are achieved, thus meeting stringent federal and state regulations governing the presence of these ions in drinking water. Concentrations of down to less than 0.01 mg/l selenium and less than 0.05 mg/l arsenic are achievable.

These ions may be removed from any aqueous solutions, preferably industrial process water streams such as mining effluents from coal and precious metal mining operations, including such streams which have been biotreated after petroleum refining.

Such process streams typically contain between about 0.01 mg/l and about 10 mg/l selenium and between about 1 mg/l and about 1,000 mg/l arsenic. The processes of this invention remove up to about 99.99 percent of the selenium present and up to about 99.99 percent of the arsenic present in such process streams. The processes of this invention are capable of removing selenium and arsenic from extremely heavily-loaded aqueous solutions, having up to 1,000 mg/l selenium and up to 1,000 mg/l arsenic.

Solutions containing selenium and/or arsenic ions are contacted with a composition capable of adsorbing these ions. Such compositions comprise at least about 10 to about 100 percent lanthanum oxide. The remainder of the composition is preferably alumina, such as activated gamma alumina available from ADCOA (Gardina, Calif.) or commercial grade activated alumina available from Discovery Chemical (Port Allen, La.). The preferred alumina is activated gamma alumina.

The aqueous solution is contacted with the lanthanum-oxide-containing composition by adding an appropriate amount of the composition to the aqueous solution, preferably with agitation.

The amount of lanthanum oxide composition is dependent upon the final desired concentration of selenium to be achieved. For example, in order to achieve 1 ppb (or 0.001 ppm), it is required that 10 percent lanthanum oxide be used. However, to achieve 10 ppb or more, we can add 10 percent lanthanum oxide to 90 percent γ-alumina. Lanthanum oxide is used for its selectivity. Alumina may be substituted for a portion of the lanthanum oxide to decrease costs. Alumina is less selective than lanthanum oxide in removing trace amounts of selenium. The molar ratio of lanthanum oxide to selenium is dependent upon the desired ultimate concentration of selenium in the solution. The average loading or uptake of selenium on lanthanum oxide is about 30–40 mg/g of oxide and for arsenic about 30–40 mg/g of oxide. Thus, at least 0.025 g oxide is required per mg selenium or arsenic.

As will be appreciated by those skilled in the art, when there are ions present in solution which compete for alumina, excess alumina should be added.

The processes of this invention are effective over a wide pH range, between about 1 and about 11, more preferably between about 4 and about 10, and most preferably between about 6 and about 9.

The solution should remain in contact with the lanthanum-oxide-containing composition for a time sufficient to remove up to 99.9 percent of the selenium and/or 99.9 percent of the arsenic present, preferably at least about three hours for solutions having high concentrations of selenium and/or arsenic. For typical process solutions having selenium concentrations about 1–10 ppm and arsenic concentrations about 1–100 ppm, the aqueous solution should remain in contact with the lanthanum-oxide-containing composition for at least about 5–30 minutes. The aqueous solution is preferably passed through a packed column containing the oxide(s). The column is filled with lanthanum oxide or lanthanum oxide-containing composition and the water is passed continuously therethrough. The packed column should have good flow characteristics to ensure contact with the catalyst.

After adsorption of oxyanions of selenium and arsenic, the adsorbed species can be removed by treating with NaOH at pH 11–13 and the lanthanum oxide composition will be regenerated and may be reused. Experiments have shown that these catalysts can be used several times, i.e., as much as 10–50 times, depending upon the counterions present.

For process solutions containing extremely high concentrations of sulfate, pretreatment with barium salts such as barium hydroxide or barium chloride to precipitate sulfate may be desirable. The lanthanum oxide and lanthanum oxide-containing composition can tolerate around 1,000 ppm sulfate; however, the adsorption of selenium will be reduced when sulfate is present. It is desirable to remove sulfate, e.g., with $BaCl_2$ and/or $Ba(OH)_2$, to a level of 100 ppm or less. This will also remove a substantial portion of the selenium. The solution from which sulfate has been substantially removed may then be treated with the lanthanum-oxide-containing composition as described above.

A preferred process of this invention uses a combination of lanthanum oxide and activated γ-alumina which is very effective over a wide range of pH, i.e., about 3 to about 10. Even at higher potential and pH, where Se(VI) is present as the major species, the combination of lanthanum oxide and activated γ-alumina acts as an excellent material for removal of selenium. Arsenic is also effectively removed by this combination. As the point of zero charge (pzc) of $La_2O_3$ (11.1) is higher than $Al_2O_3$ (9.2), $La_2O_3$ is more favorable for selenium recovery at higher pH. The combination of $La_2O_3$ and $Al_2O_3$ increases the adsorption of selenium from process water. These processes do not require any pretreatment of the treating agents and work at ambient temperature. Further, the processes of this invention do not require any adjustment of pH of the aqueous solution.

EXAMPLES

All adsorption isotherms were obtained using batch adsorption experiments and all batch scale studies were performed with deionized water spiked with selenium(IV) and/or selenium(VI) or arsenic(V) as the stock solution. Predetermined amounts of oxides were placed in 250 ml Pyrex™ flasks with glass stoppers. The concentration of the sorbate was varied from 1 to 1000 ppm to simulate the concentrations of selenium in mining industry. The pH was adjusted using strong acid (HCl) or strong base (NaOH). The oxidation-reduction potential of the solution was maintained at the desired value by passing pure oxygen through it. Contact was achieved by mixing with in water bath shakers at 300 rpm. The flasks were continuously shaken at room temperature (25° C.) for attainment of equilibrium. To determine kinetics of removal, samples were removed at specified time intervals, pH was measured, samples were filtered through Whatman No. 5 filter paper, and the concentrate in the filtrate was determined using atomic adsorption spectrophotometry. Control flasks containing the selenium stock solution without any sample (adsorbent) showed no loss of selenium or arsenic during the tests. A series of experiments were conducted using different concentrations of selenium and arsenic and different oxides and/or combinations of oxides.

Example 1. Removal of Selenium with Commercial Alumina

Figure 2:
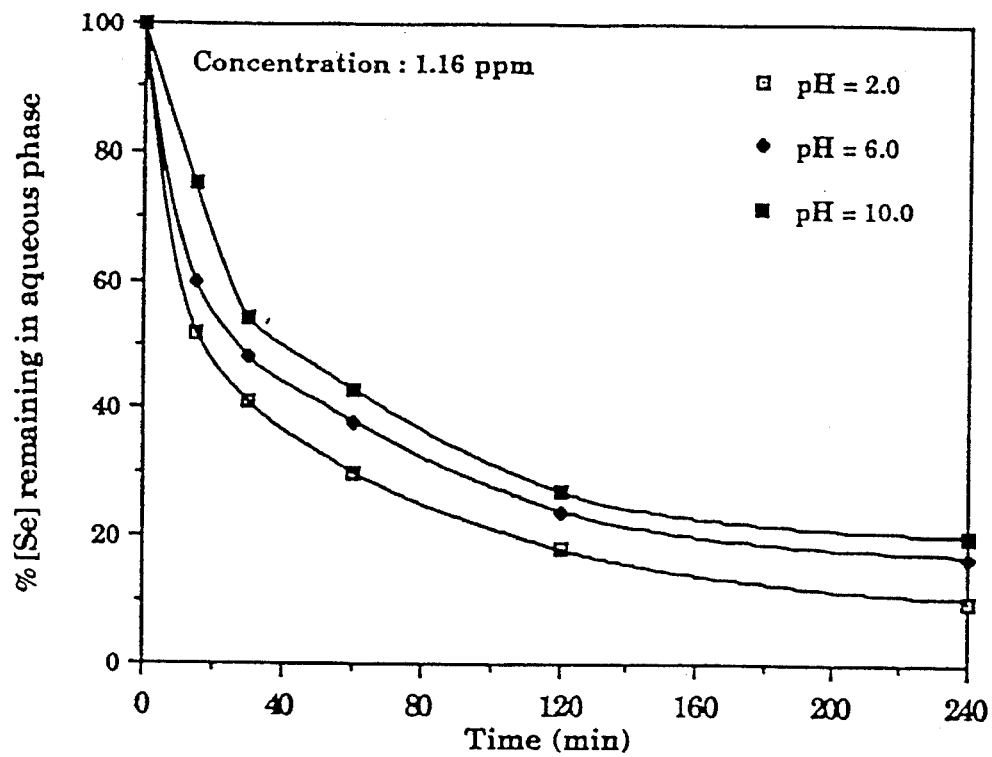
FIGS. 2 and 3 illustrate the effect of pH on the removal of selenium (1.16 ppm and 9.75 ppm) with commercial alumina at pH 2, 6 and 10.
Figure 3:
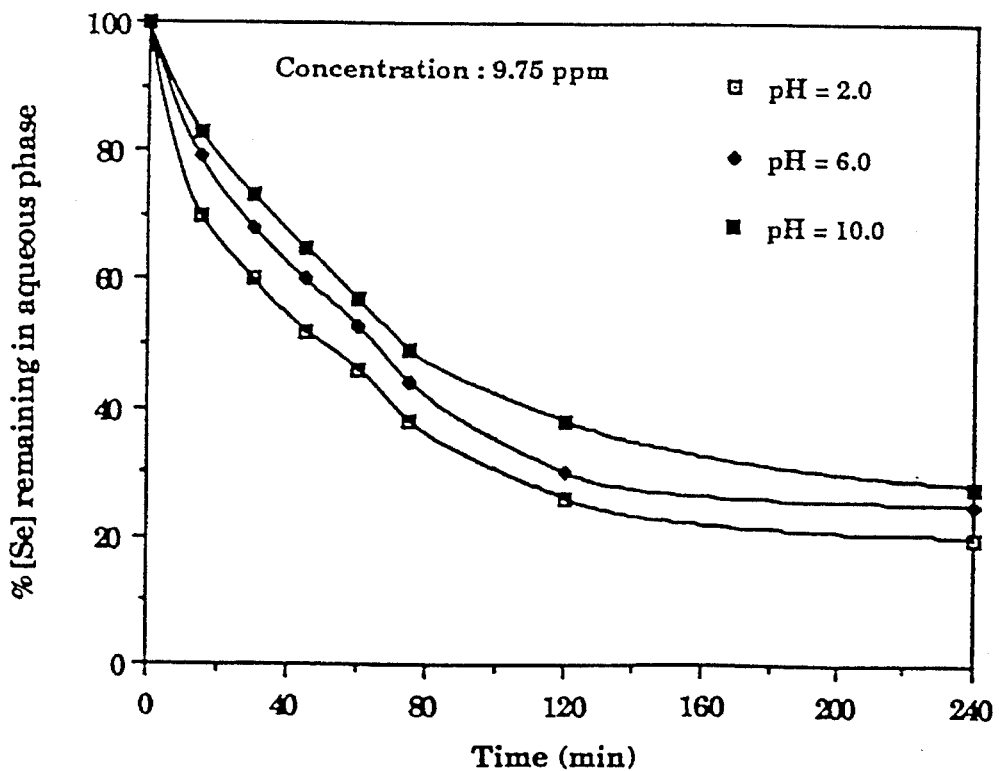

The removal of selenium as a function of time with commercial grade DD-6™, Discovery Chemical (Port Allen, La.), (alumina catalyst) is given in FIGS. 1, 2 and 3. As can be seen, after four hours, 20–40 percent of initial selenium remained in solution. FIGS. 2 and 3 show the uptake of selenium as a function of time at differing pH. Notice that selenium uptake decreased with increase in pH. Nevertheless, the final amount of selenium in the solution was around 20–40 percent of the original concentration. Thus, commercial grade activated alumina DD-6™ alone cannot remove the residual traces of selenium.

Example 2. Removal of Selenium with Lanthanum Oxide ($La_2O_3$)

Figure 4:
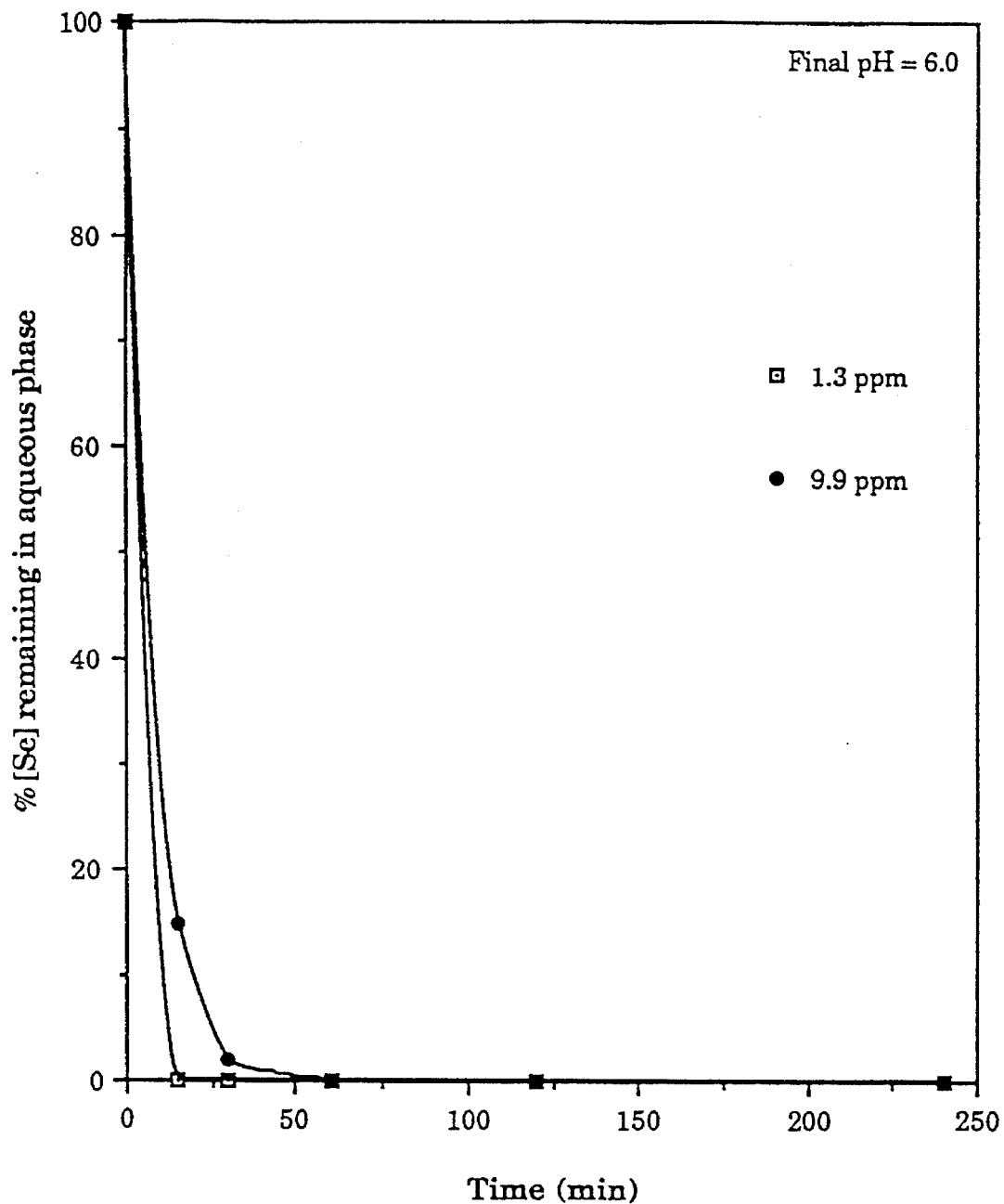
FIG. 4 shows removal of selenium with lanthanum oxide at 1.3 ppm and 9.9 ppm over a period of 250 minutes at a pH of 6.0.
Figure 5:
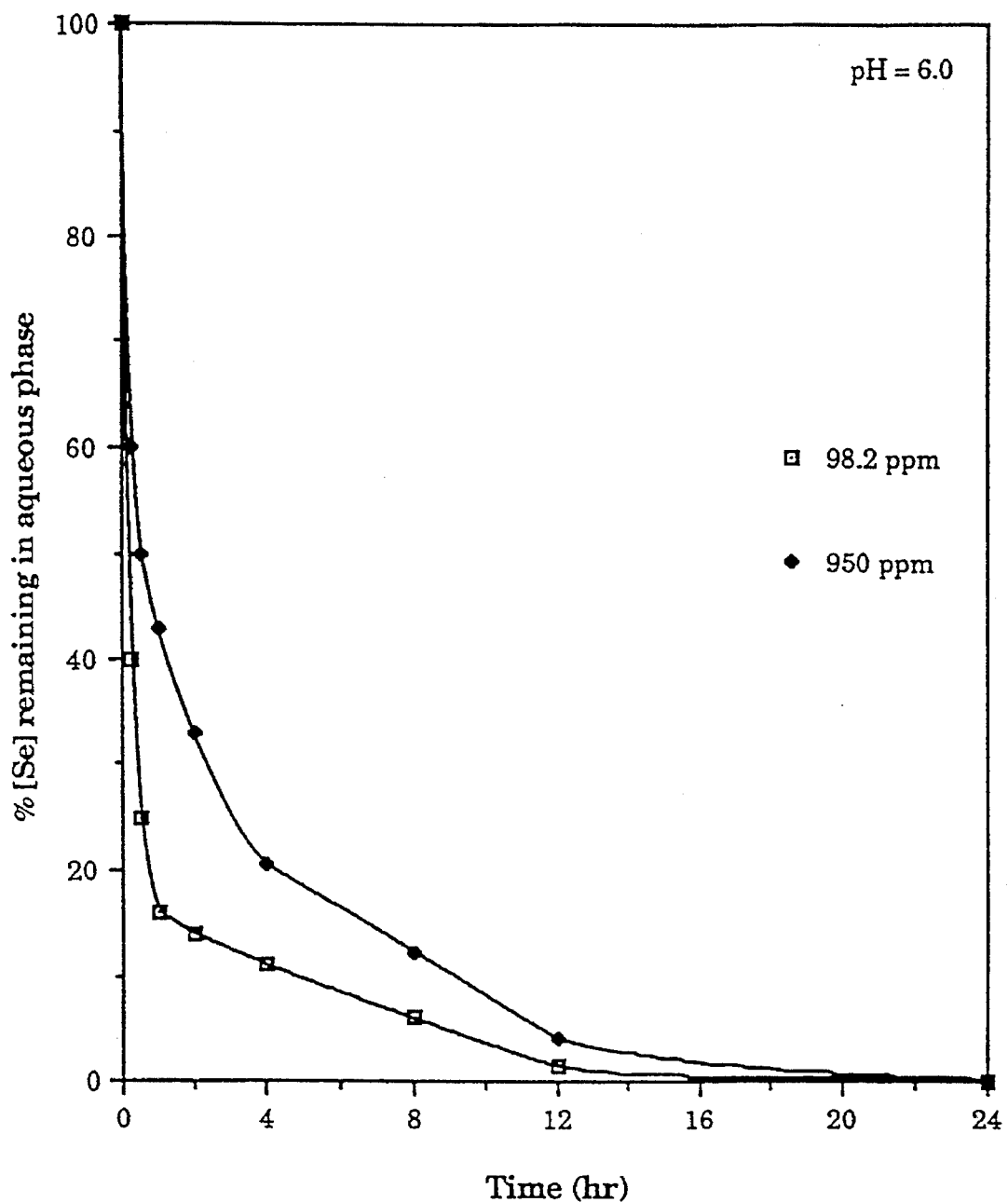
FIG. 5 shows removal of selenium with lanthanum oxide at 98.2 ppm and 950 ppm over a period of 24 hours at a pH of 6.0.

The removal of selenium as a function of time with lanthanum oxide is given in FIGS. 4 and 5. As can be seen, at two different levels of selenium concentration, almost all the selenium was removed in less than an hour for solutions with initial selenium concentrations of less than 10 ppm and less than 24 hours for solutions with initial selenium concentrations of 98.2 ppm.

Example 3. Removal of Selenium with Mixed Oxide (90% DD-6™ Alumina and 10% $La_2O_3$)

Figure 6:
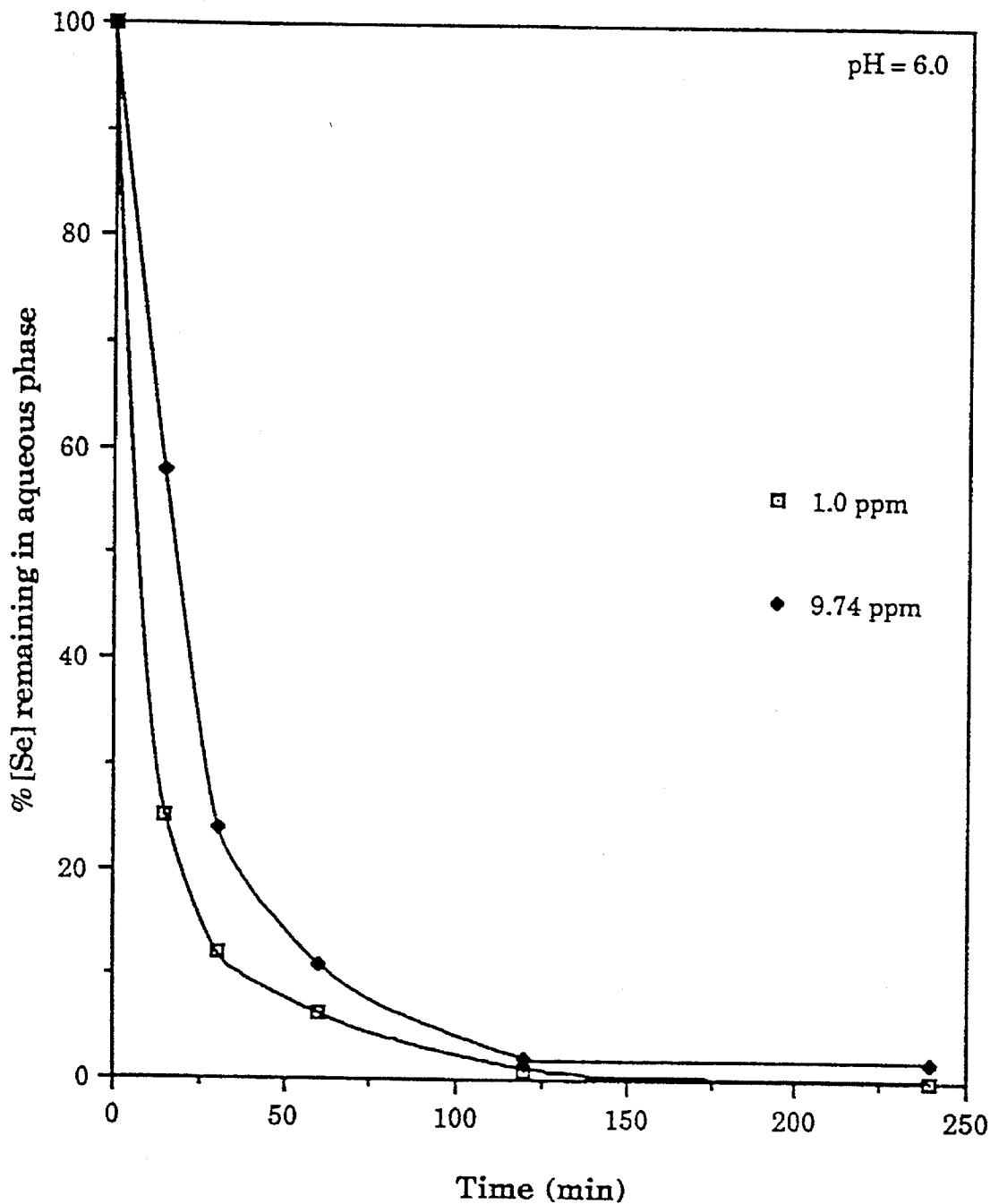
FIG. 6 shows removal of selenium with 10% lanthanum oxide and 90% commercial alumina over a period of 250 minutes at a pH of 6.0.
Figure 7:
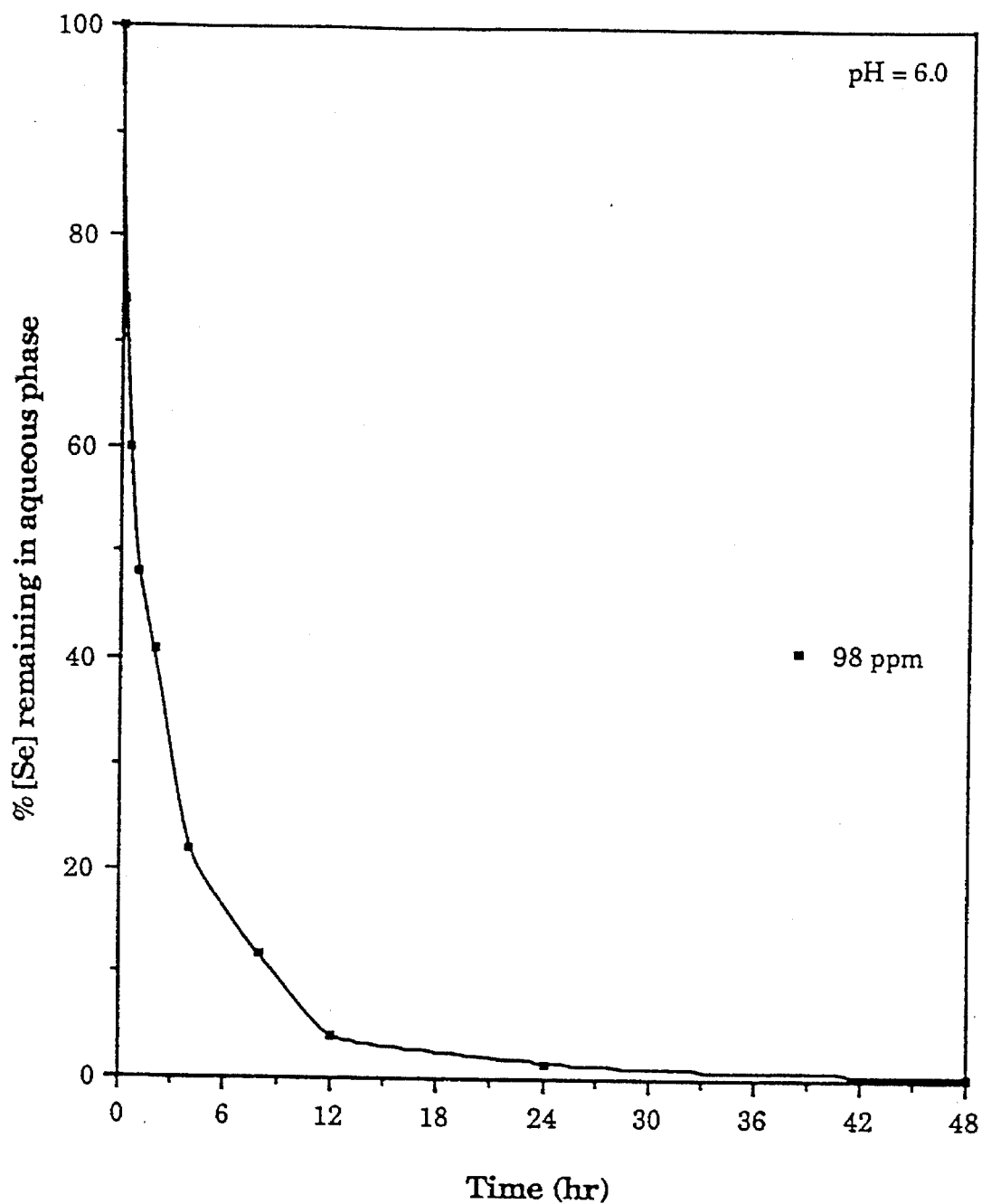
FIG. 7 shows removal of selenium with 10% lanthanum oxide and 90% commercial alumina over a period of 48 hours at a pH of 6.0.

The removal efficiency of selenium with combined oxides of DD-6™ alumina and lanthanum oxide is given in FIGS. 6 and 7. It is impressive to see that the addition of lanthanum oxide to DD-6™ alumina drastically improved the removal efficiency and substantially lowered the final selenium concentration achievable from 20 percent to about <1 percent. The combination of oxides is a low-cost catalyst for selenium removal as compared to lanthanum oxide alone.

Figure 8:
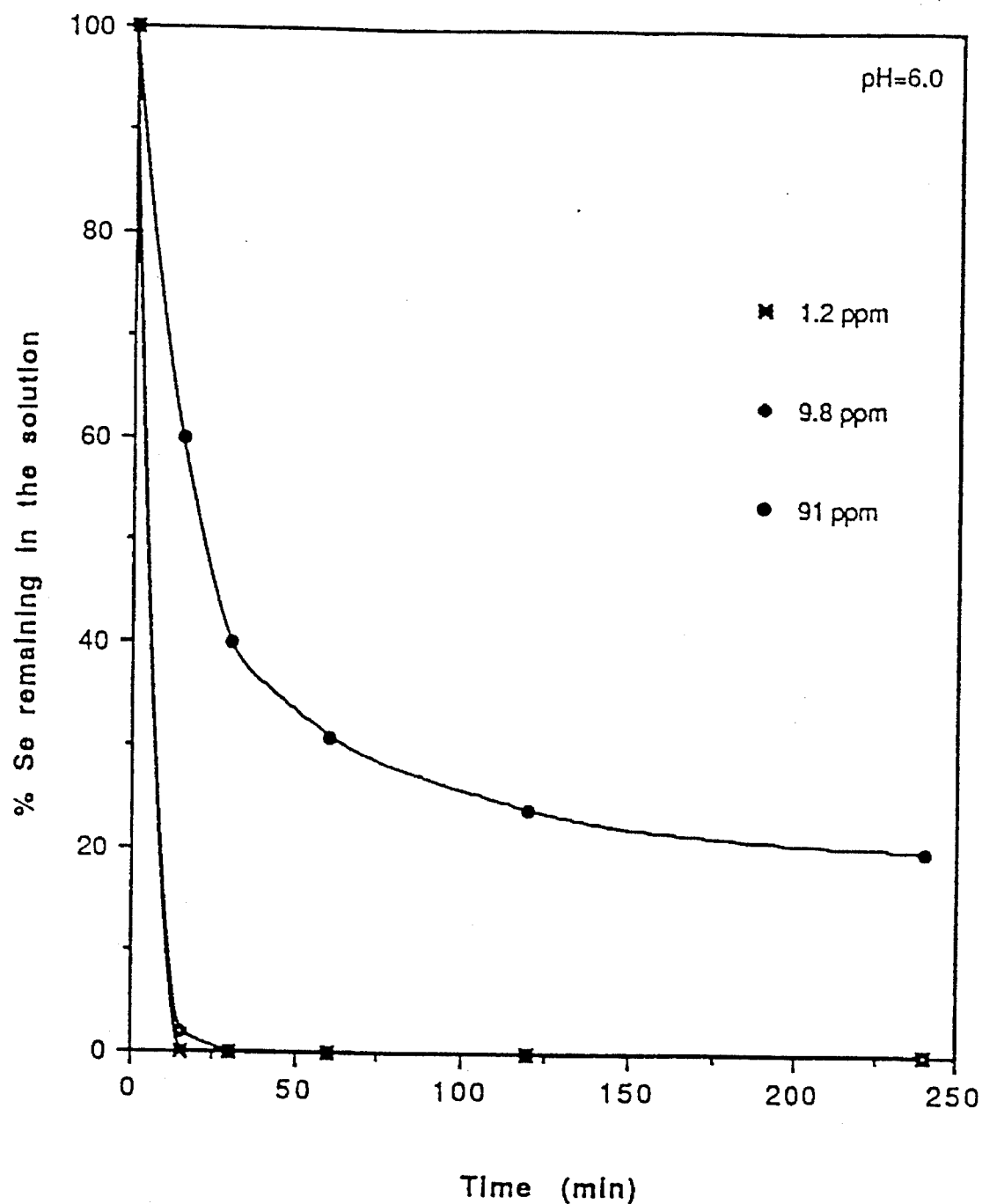
FIG. 8 shows removal of selenium with activated γ-alumina over a period of 250 minutes at a pH of 6.0.
Figure 9:
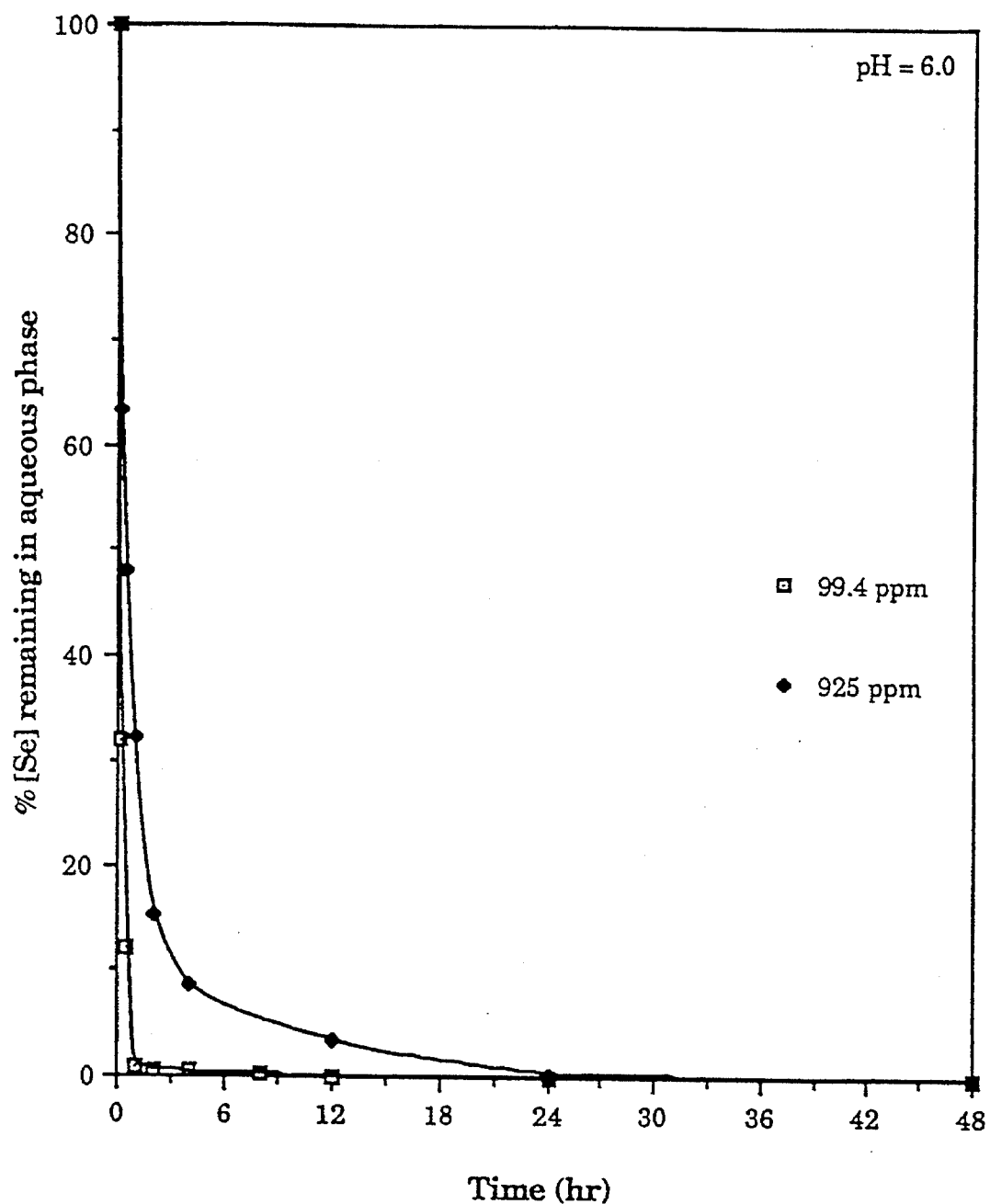
FIG. 9 shows removal of selenium with 10% lanthanum oxide and 90% activated γ-alumina over a period of 48 hours at a pH of 6.0.

Example 4. Removal of Selenium with Mixed Oxide (90% alumina and 10 percent $La_2O_3$ Lanthanum oxide mixed with gamma-alumina showed similar results to those of Example 3. See FIGS. 8 and 9. FIG. 8 shows removal of selenium with activated γ-alumina. For selenium concentrations of 91 ppm more than 20% of the initial concentration of selenium remained in solution after 4 hours. FIG. 9 shows removal of selenium with 90% activated γ-alumina and 10% lanthanum oxide. Within less than an hour almost 100% of selenium from the solution having an initial concentration of 99.4 ppm was removed. After 24 hours almost 100% of selenium from a solution having an initial concentration of 925 ppm was removed.

Example 5. Removal of Selenium with Other Oxides

Figure 10:
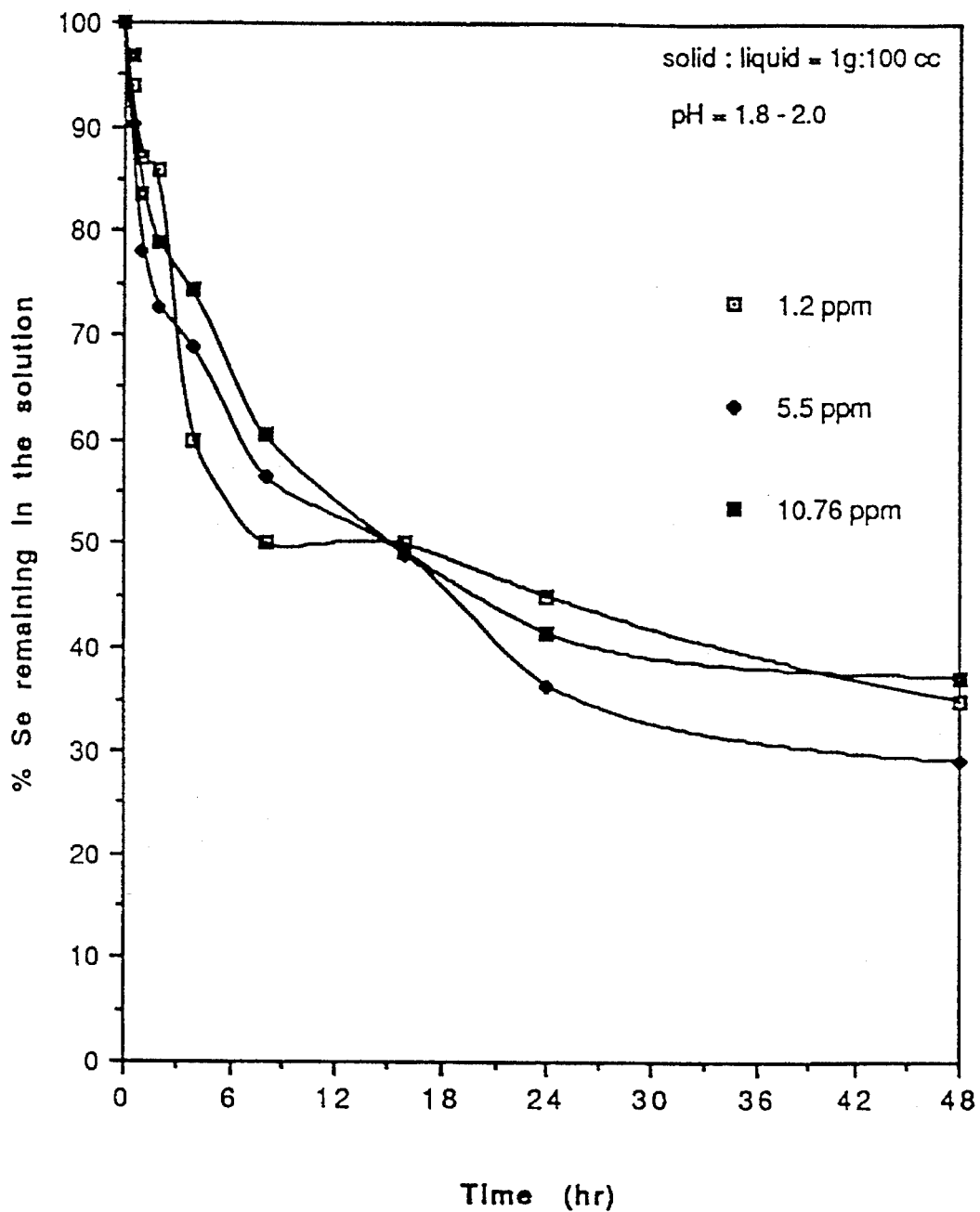
FIG. 10 shows removal of selenium with titania over a period of 48 hours at a pH of 1.8–2.0.

Studies were performed using several other oxides for selenium removal. The removal efficiency of selenium with $TiO_2$ is given in FIG. 10. Note that $TiO_2$ is not even as good as alumina alone. Compounds such as $MnO_2$ and $Fe_2O_3$ (results not shown) were not effective for complete selenium removal.

Example 6. Removal of Arsenic with DD-6™ Alumina

Figure 11:
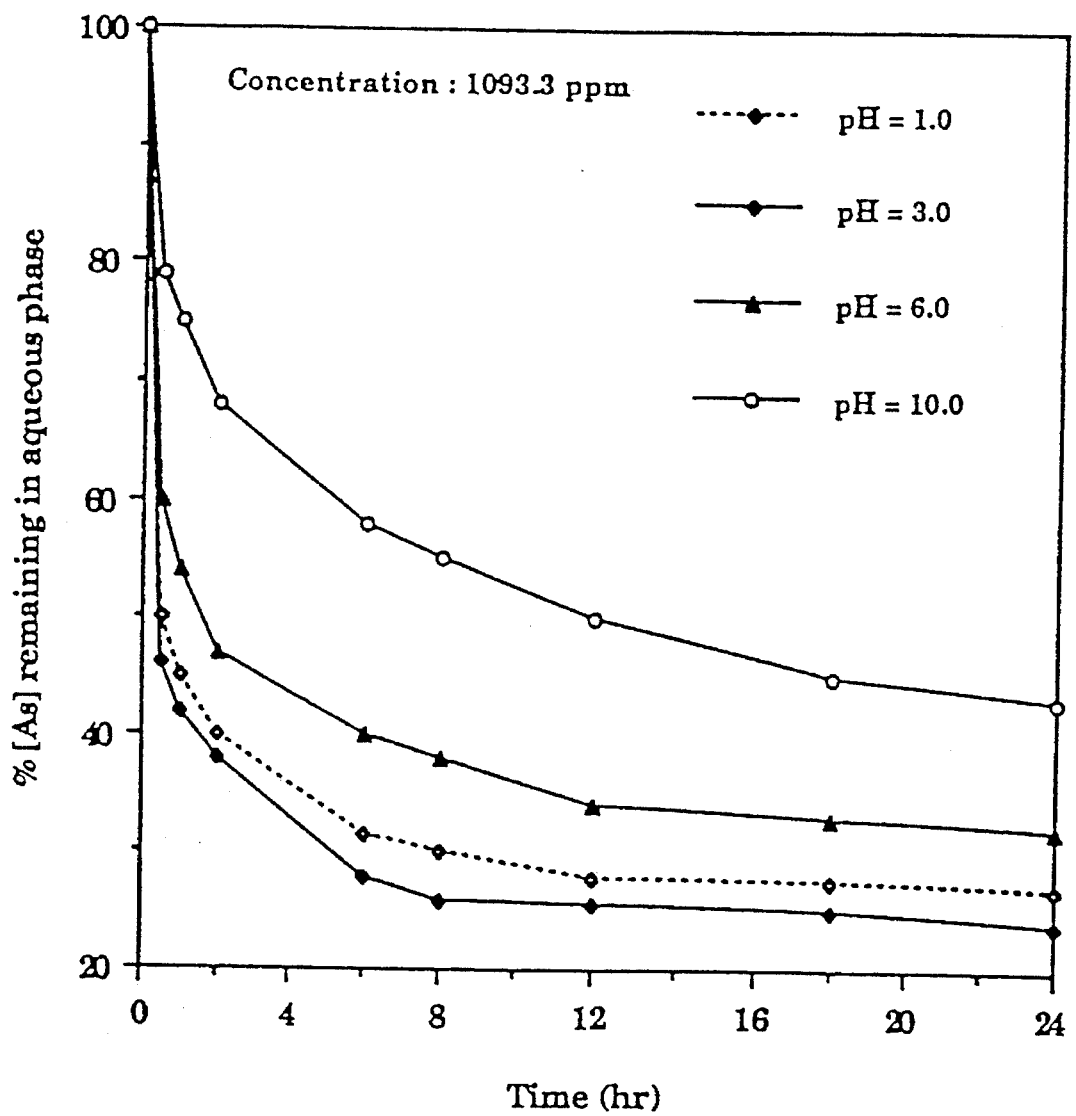
FIG. 11 shows removal of arsenic (As(V)) with commercial alumina over a period of 24 hours at pH of 1.0, 3.0, 6.0 and 10.0.

The removal of arsenic with DD-6™ alumina as a function of time is given in FIG. 11. DD-6™ alumina can remove arsenic from solution down to about 22 to 45 percent initial concentration. Arsenic removal is highly dependent upon the pH, being better at lower pH.

Figure 12:
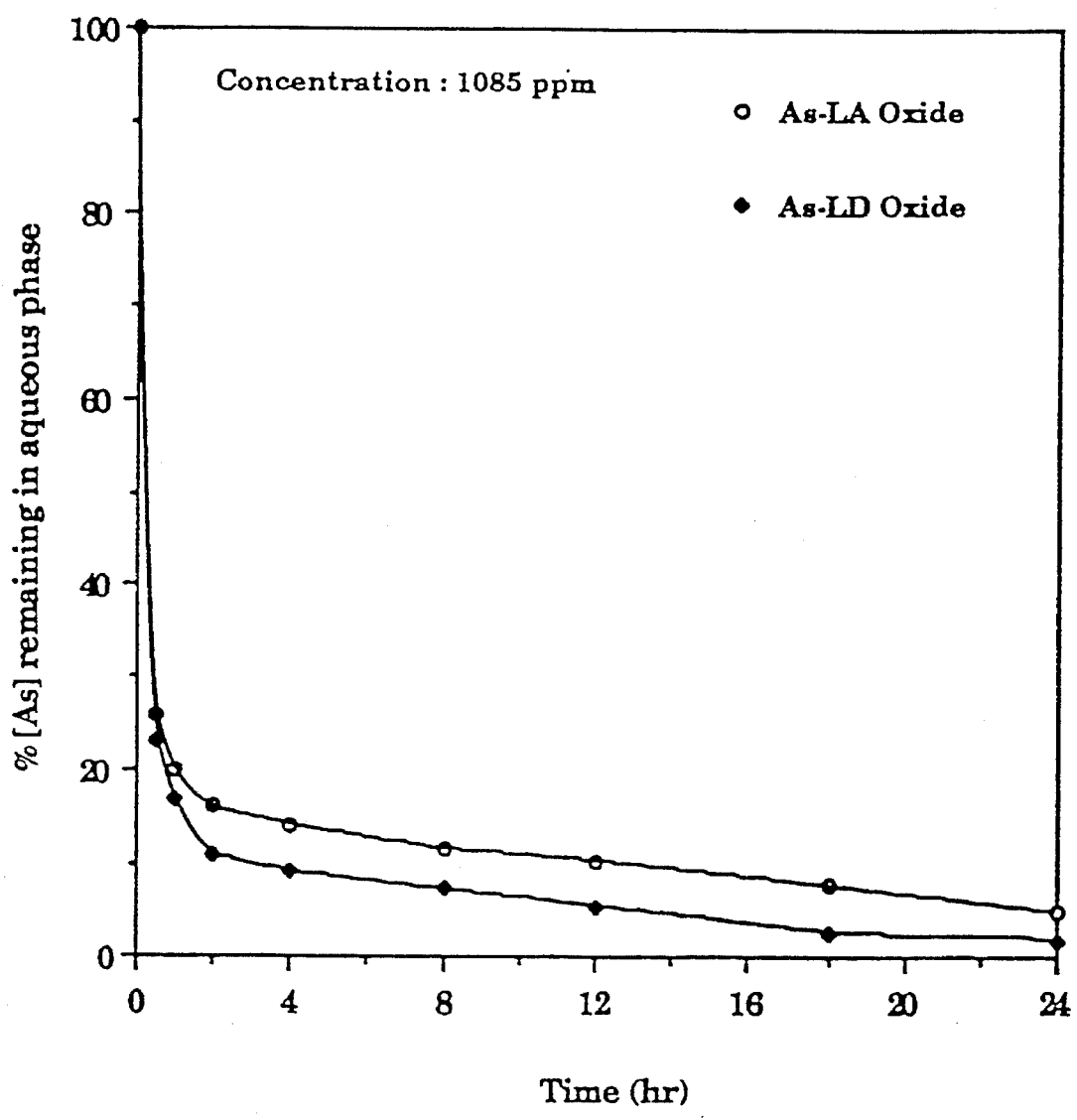
FIG. 12 shows removal of arsenic (As(V)) with 10% lanthanum oxide and 90% commercial alumina over a period of 24 hours.

Example 7. Removal of Arsenic with Combined Oxides: 10% Lanthanum Oxide and 90% DD-6™ Alumina From FIG. 12 it can be seen that almost all the arsenic was removed from solution by combining 10% lanthanum oxide with 90% DD-6™ alumina. Similar results were obtained by combining lanthanum oxide with γ-alumina catalyst (data not shown). These experiments confirm that lanthanum oxide addition synergistically increases the arsenic removal efficiency of alumina.

Example 8. Point of Zero Charge of Lanthanum Oxide

Figure 13:
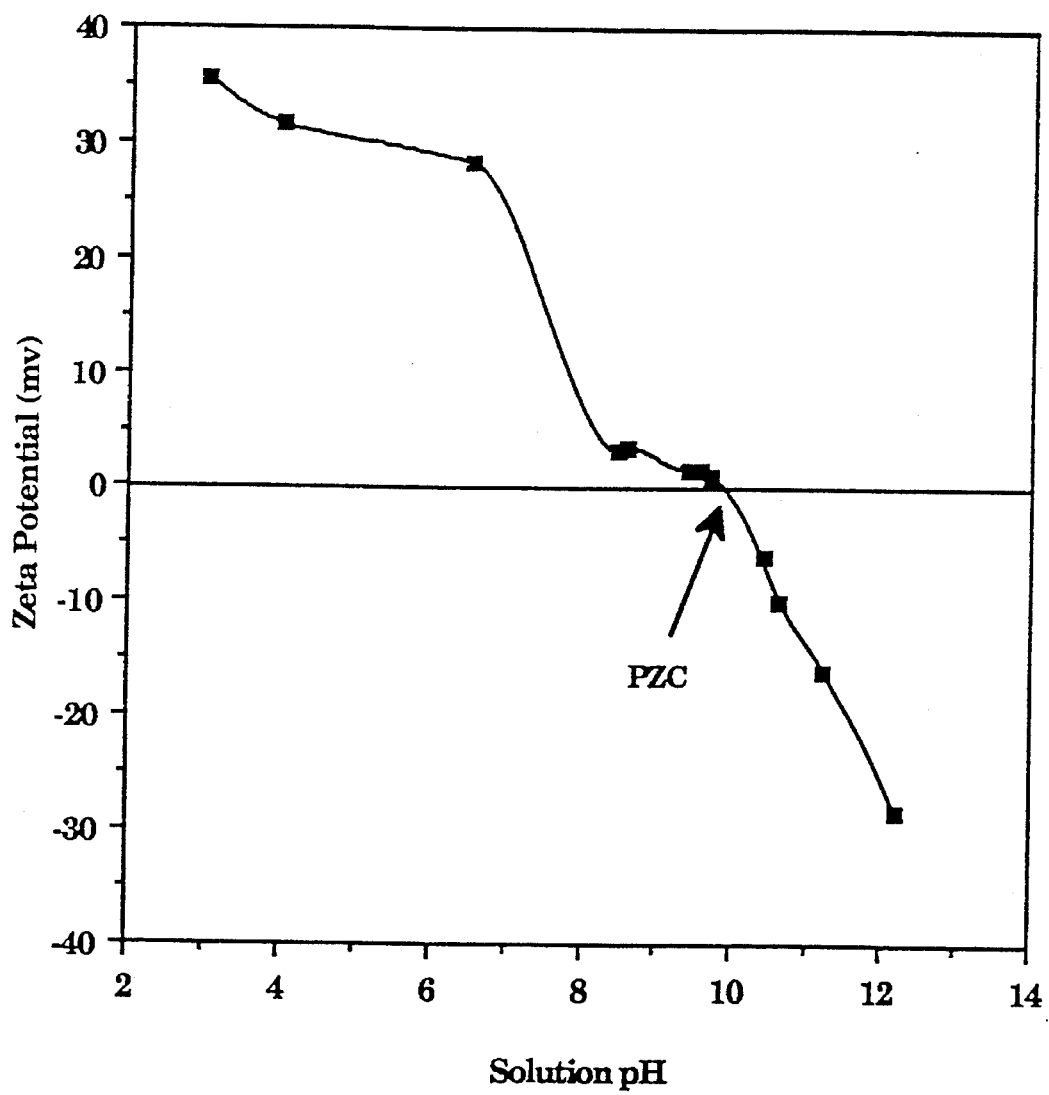
FIG. 13 shows zeta potential of lanthanum oxide as a function of solution pH.
Figure 14:
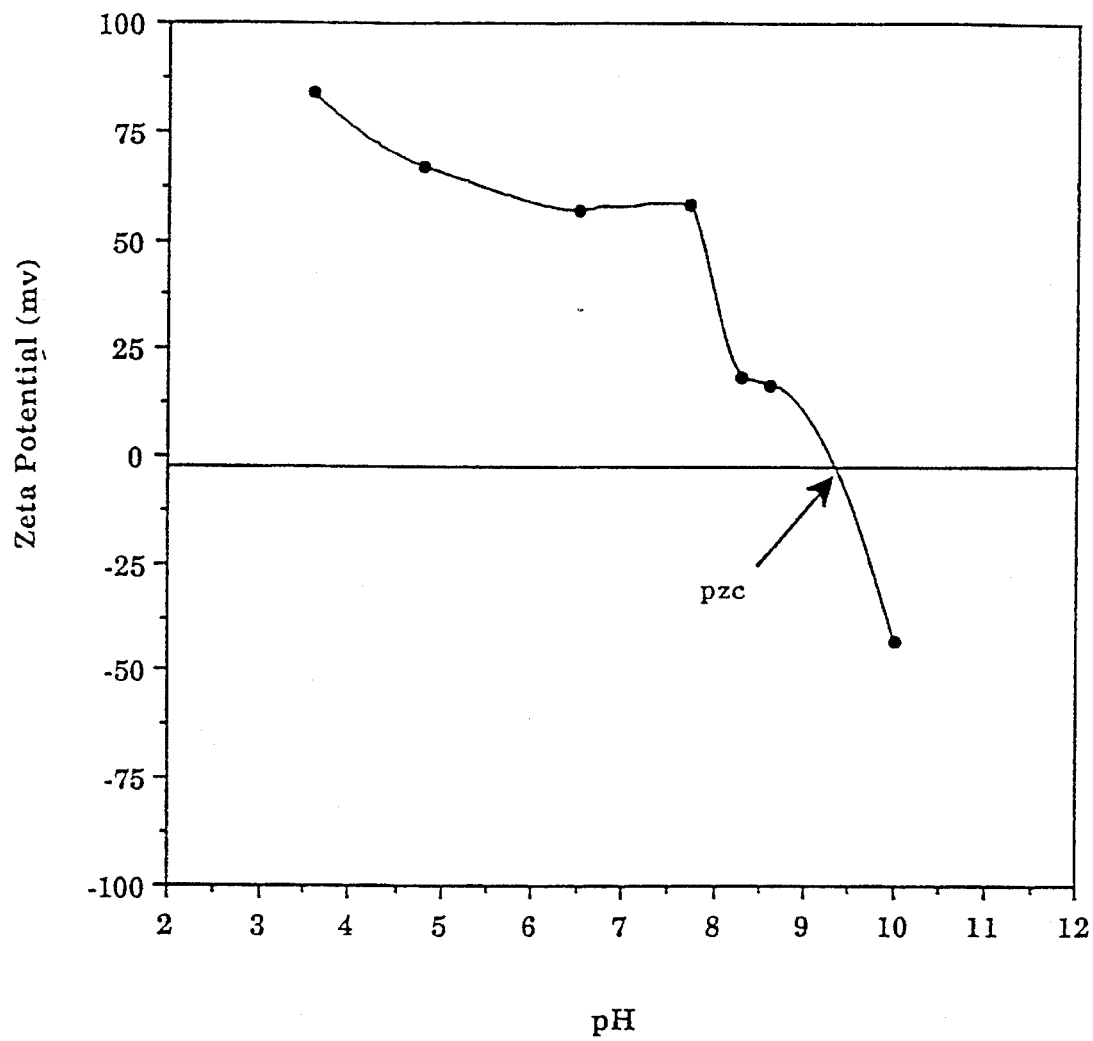
FIG. 14 shows zeta potential of activated γ-alumina as a function of solution pH.

Lanthanum oxide has a higher point-of-zero charge than alumina compounds (See FIGS. 13 and 14). The high positive charge at the surface facilitates the high affinity for the surface of negatively charged oxyanions of selenium and arsenic.

Example 9. Lanthanum Oxide-Alumina-Selenium Complex

Figure 15:
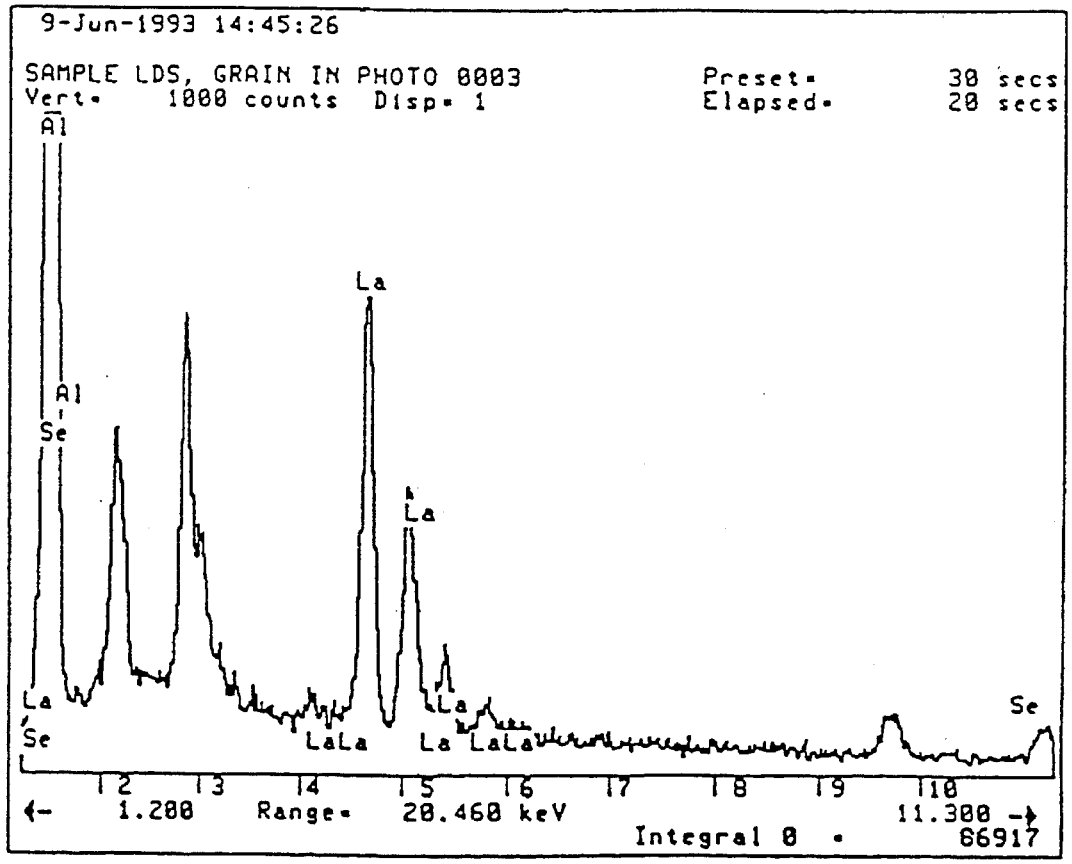
FIG. 15 shows scanning electron micrograph and energy dispersive X-ray (SEM-EDAX) analysis of lanthanum oxide after adsorption of selenium.

The SEM/EDAX analyses confirmed that selenium is adsorbed on the site. See FIG. 15. Note the selenium has been identified at the surface of lanthanum oxide.

Example 10. Removal of Selenium from Industrial Process Streams

The utilization of lanthanum oxide or a combination of lanthanum oxide with commercial grade alumina DD-6™ alumina or γ-alumina were tested for a variety of process waters. In each case it was observed that lanthanum oxide alone or in combination is a good adsorbent for selenium and arsenic.

Table I describes stripped sour water and biotreated effluents from Shell Oil Company (Houston, Tex.).

TABLE I

Selenium-bearing refinery wastewater streams.

| Parameter | Stripped Sour Water | Final (biotreated) Effluent |
| --- | --- | --- |
| flow rate (gpm) | 100–1000 | 2000–5000 |
| pH | 6–12 | 6.5–8.5 |
| temperature (C.) | 80–115 | 20–35 |
| total selenium (ppb) | 1000–5000 | 50–300 |
| Selenimn Species: | | |
| selenide (%) | <20 | 0 |
| elemental selenium (%) | <10 | 0 |
| selenite (%) | <5 | 10–95 |
| selenate (%) | <1 | <30 |
| total sulfur (mg S/L) | 50–200 | 300–800 |
| sulfur as sulfate (%) | <1 | 100 |
| ammonia (mg N/L) | 20–200 | <5 |
| nitrate (mg N/L) | 0 | 5–30 |
| total dissolved solids (mg/L) | 200–2000 | 2000–7000 |
| total hardness (mg $CaCO_3$/L) | <20 | 50–300 |
| total alkalinity (mg $CaCO_3$/L){?} | <20–1000 | 50–300 |
| total organic carbon (mg/L) | 500–10000 | <50 |
| chemical oxygen demand (mg/L) | 2000–30000 | <50 |
| biochemical oxygen demand (mg/L) | 500–10000 | <30 |
| total suspended solids (mg/L) | 50–200 | <30 |

Batch adsorption experiments were performed on the stripped sour water and biotreated sour water industrial process streams using the following adsorbents: (1) Commercial DD-6™ alumina; (2) γ-alumina; and (3) 10% lanthanum oxide and 90% γ-alumina. The initial and final concentration were recorded for each adsorbent and wastewater. The results are given in Table II.

TABLE II

Removal of Selenium from Stripped and Biotreated Sour Water

| Adsorbent | Total Se Concentration (ppm) |
| --- | --- |
| Biotreated Sour Water | |
| none | 0.238 |
| Commercial DD-6 ™ | 0.100 |
| γ-alumina | 0.040 |
| 10% Lanthanum oxide and 90% γ-alumina | 0.036 |
| Stripped Sour Water | |
| none | 1.552 |
| Commercial DD-6 ™ | 1.051 |
| 10% Lanthanum oxide and 90% γ-alumina | 1.052 |

These results show that the adsorption process is effective for biotreated waste water and minimally effective for sour water because of the presence of significant amounts of organic compounds in the sour water and because the biotreated water is oxidized. As a result, the selenium is mostly in the form of selenite or hydrogen selenite in the biotreated water. Furthermore, the pH of the biotreated water is between 6.5 and 8.5, which is lower than the stripped sour water's pH range.

Example 11. Removal of Selenium from Process Water Containing Cyanide

Figure 16:
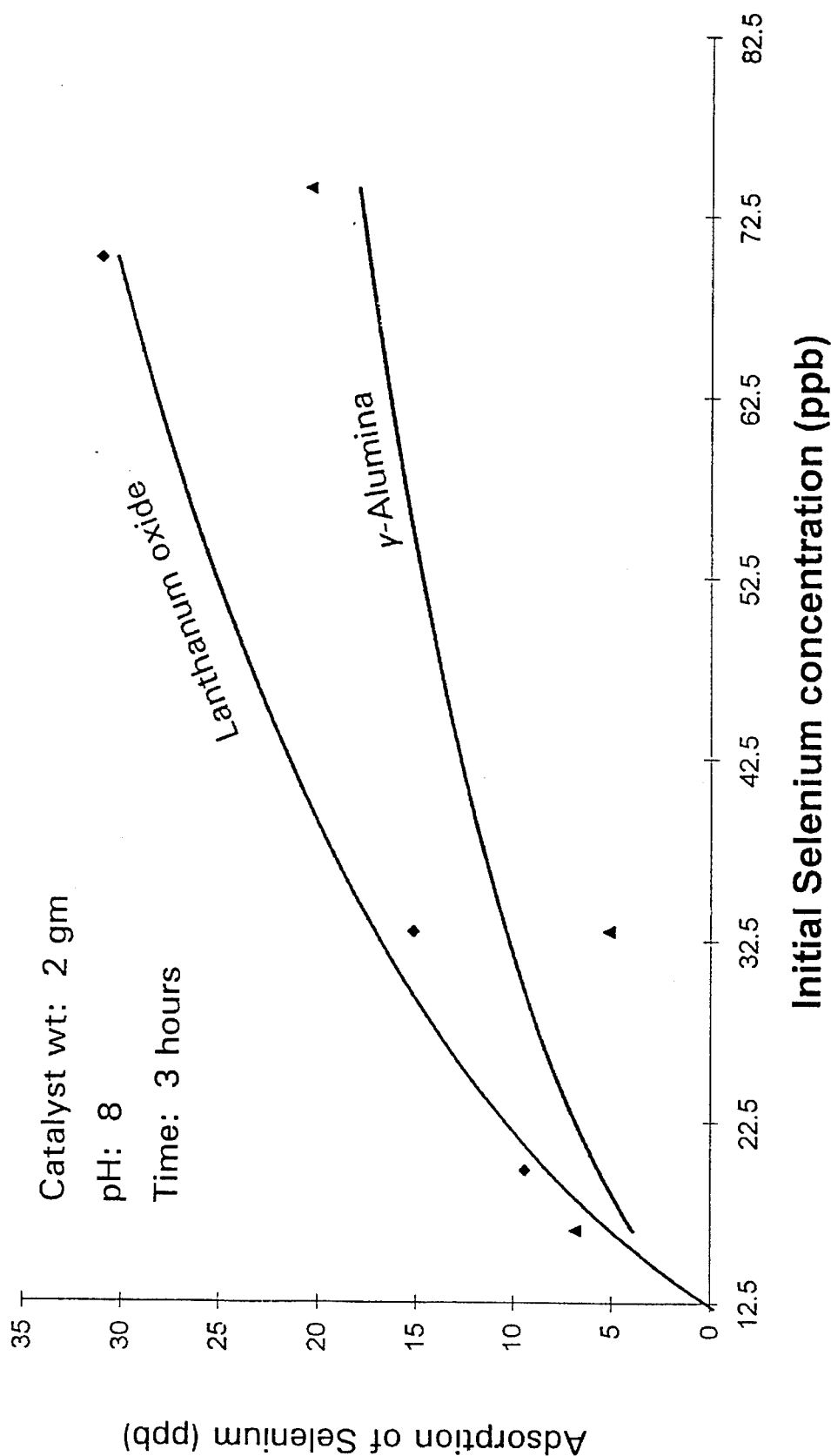
FIG. 16 shows the adsorption of selenium onto an activated γ-alumina-AC(T) lanthanum oxide LA(T) composition as a function of initial selenium concentration in the presence of cyanide and other interfering ions obtained from a gold-cyanide operation.
Figure 17:
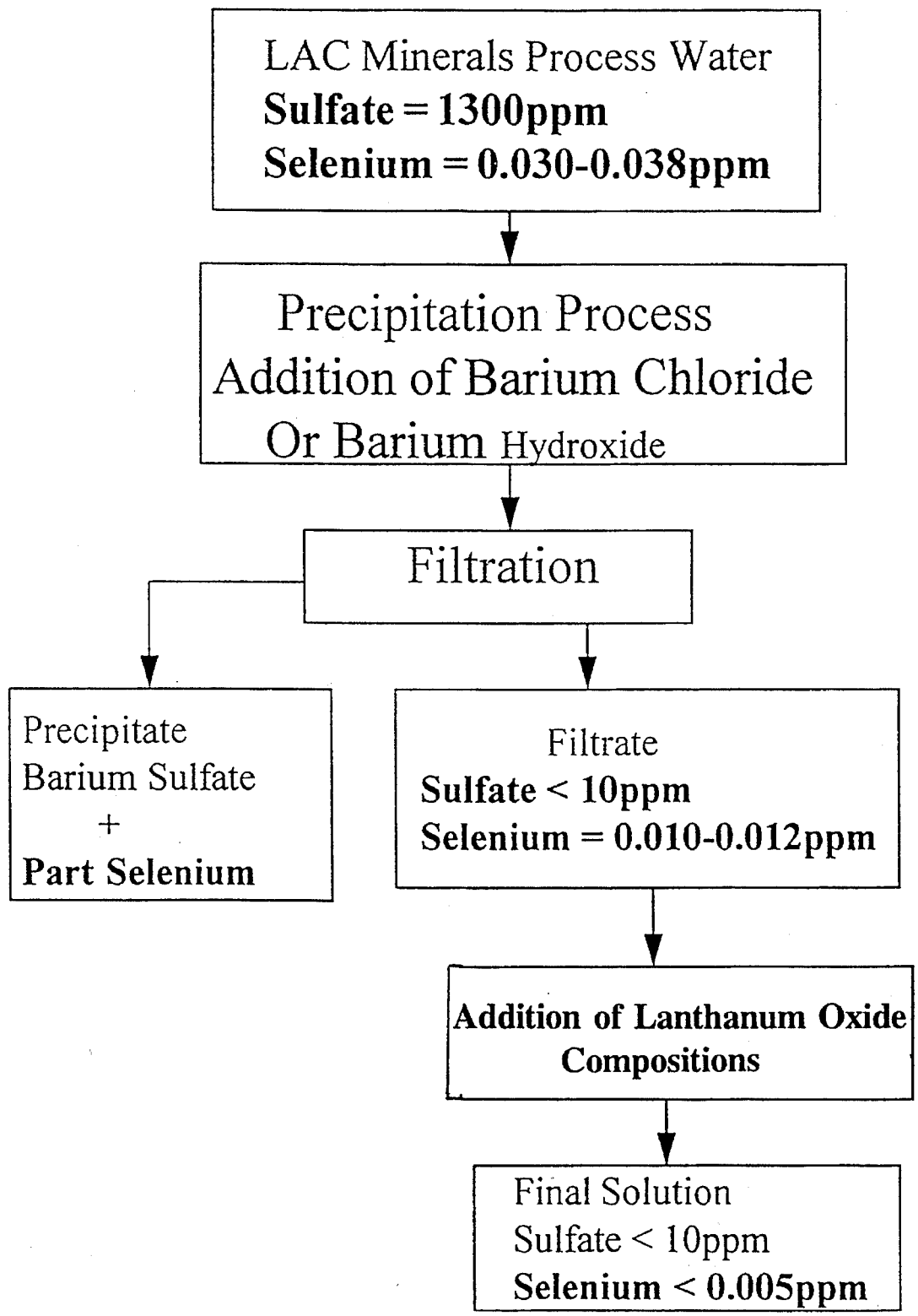
FIG. 17 illustrates the process of removal of selenium from a solution of high sulfate concentration, including the addition of lanthanum oxide and activated γ-alumina.

As shown in FIG. 16, lanthanum oxide (2 g) is more effective for removing selenium from cyanide-containing solutions than activated γ-alumina. Lanthanum oxide also has better selectivity than γ-alumina.

Example 12. Removal of Selenium from Sulfate-Containing Acid Mine Water

Experimental results and a flowsheet for removing selenium from sulfate-containing water are given in FIG. 16. Note that if high sulfate is present it can be separated as $BaSO_4$ and residual selenium can be removed by lanthanum oxide and/or lanthanum oxide in combination with γ-alumina. Also note that during $BaSO_4$ precipitation some selenate present in the solution is removed.

The foregoing examples clearly demonstrate the superior effectiveness of lanthanum oxide and combinations of lanthanum and aluminum oxide as adsorbing agents for selenium and arsenic in comparison to other agents. Reduction in selenium concentration by using lanthanum oxide or lanthanum oxide in combination with alumina as the treating agent generally is found to be at least 80 to 99.99 percent.

While the invention herein has been described and illustrated in terms of what at present are believed to be the preferred embodiments, it is to be understood that this invention is not to be limited to these specific embodiments and that changes can be made in the processes and apparatuses employed without departing from the spirit and scope of the invention.

We claim:

1. A process for removing at least one oxyanion selected from the group consisting of selenite, selenate, arsenite and arsenate from solution comprising:

a) contacting said solution with a composition comprising lanthanum oxide whereby said oxyanion is adsorbed onto said composition to form an insoluble complex comprising lanthanum oxide and said oxyanion;

b) separating said solution from said complex.

2. The process of claim 1 wherein said composition also comprises alumina.

3. The process of claim 2 wherein said composition comprises at least about 10 percent lanthanum oxide and about 90 percent alumina.

4. The process of claim 1 wherein selenite or selenate is removed.

5. The process of claim 1 wherein selenite or selenate is removed down to a concentration of less than 0.01 mg/l.

6. The process of claim 1 wherein arsenite or arsenate is removed.

7. The process of claim 1 wherein arsenite or arsenate is removed down to a concentration of less than about 0.01 mg/l.

8. The process of claim 1 wherein selenite is removed.

9. The process of claim 1 wherein selenate is removed.

10. The process of claim 1 wherein arsenite is removed.

11. The process of claim 1 wherein arsenate is removed.

12. The process of claim 1 wherein the pH of said solution is greater than about 6.

13. The process of claim 1 wherein said lanthanum oxide-containing composition is present in an amount of 0.025 g per mg selenite, selenate, arsenite and/or arsenate.

14. The process of claim 1 wherein said solution comprises selenite and/or selenate and arsenite and/or arsenate.

15. The process of claim 1 wherein said separation is performed by contacting said solution with a packed column containing said lanthanum oxide-containing composition.

16. The process of claim 1 wherein said solution is pretreated with barium salts to remove sulfate.

17. The process of claim 1 wherein said solution is biotreated industrial process water.

18. The process of claim 1 wherein said process produces potable water.

* * * * *